Figure 1:
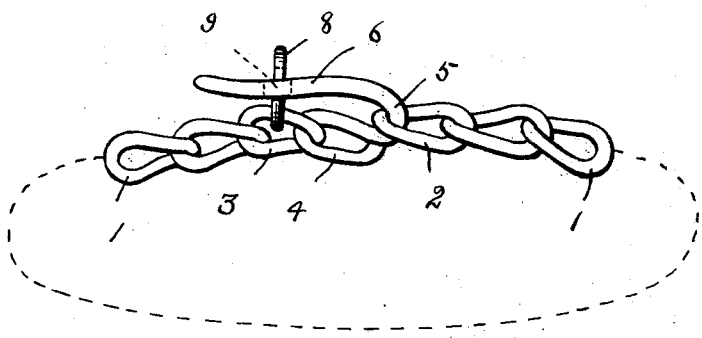

April 8, 1930.                G. JOHNSON                1,753,607
                               CHAIN HOOK
                            Filed June 21, 1929

Inventor
Gustaf Johnson.
By Geo Stevens
Attorney

Patented Apr. 8, 1930

1,753,607

UNITED STATES PATENT OFFICE

GUSTAF JOHNSON, OF DULUTH, MINNESOTA

CHAIN HOOK

Application filed June 21, 1929. Serial No. 372,721.

This invention relates to terminal hooks for chains and has special reference to one particularly adapted for use in connection with emergency traction chains for automobiles.

The principal object is to provide a more practical, simple, and efficient device than heretofore known.

Another object is to provide one less apt to become unhooked by accident;

Another object is to provide such a device which may operate with equal efficiency in any link of the chain, to accommodate various diameters of tires.

Other objects and advantages of the invention will appear in the following description thereof.

Figure 2:
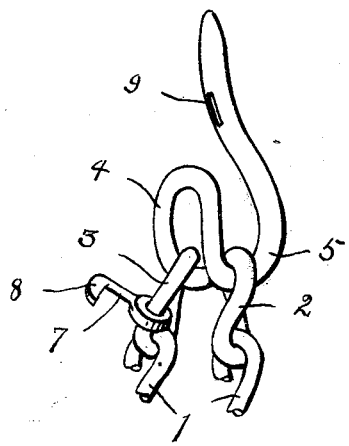

Referring now to the accompanying drawing forming part of this application and wherein like reference characters indicate like parts:

Figure 1 is an elevation of the hook as applied to the two terminal links of an emergency cross-chain, the latter being shown partially suggestive; and Figure 2 is a similar view showing the hook in its relation to the terminal links of the chain just prior to assuming the position illustrated in Figure 1 of the drawings.

1 represents a common twisted link cross-chain, 2 being the free end terminal link at one end and 3 the similar link at the opposite end, and into which latter is fixed the loop 4 of the novel terminal hook. This link is made comparatively long or in fact approximately the length of an ordinary link of the chain so as to allow free manipulation of same within the loop. An open loop 5 is formed by the curvature of the hook 6 in relation to the side wall of the loop 4 for hooking engagement with the free terminal link 2 of the chain, and is of a size which may be conveniently hooked into any of the links of the chain, so should the chain prove too long for a certain tire, the hook may be made to engage the end of the next adjacent link, or the third or fourth, as desired. It will be noted that when the hook is turned to locked position as shown in Figure 1 the draft on the two terminal links occurs substantially opposite each other and thereby tends to hold the hook in closed or locked position. As an auxiliary locking means I have shown a dog or hook 7 mounted on one side of the terminal link 3, this dog or hook having a lip or finger-like projection 8 extending at substantially right angles to the medial line of the link, and for cooperation therewith there is provided the through elongated slot 9 adjacent the handle end of the hook 6. As is obvious when the hook 6 approaches closed position, there being naturally, when the chain 1 is not drawn tight, sufficient slack of the terminal link 3 to permit of the hook or dog 7 being slipped through the slot 9 with the finger 8 projecting above the hook 6, and at the time of the chain being drawn tight this finger will assume a normal position transverse the medial link of the hook 6 and thereby act as a holding dog for same and can only be removed when there is sufficient slack in the chain to permit twisting of the dog 7.

From the foregoing it is evident that I have devised an exceedingly simple and efficient safety hook, having twin loops, for chains.

Having thus described my invention, what I claim and desire to secure by Letters Patent, is:

A terminal hook for chains having twin loops at one end one being open for selective engagement with links of one end of the chain and the other loop permanently attached to the opposite end of the chain, and a hook carried by the chain adjacent the terminal hook for locking engagement therewith.

In testimony whereof I affix my signature.

GUSTAF JOHNSON.